Dec. 4, 1923.
O. PASCALE
1,476,461
AIR HEATING AND IMPREGNATING APPARATUS
Filed Nov. 16, 1922     2 Sheets-Sheet 1
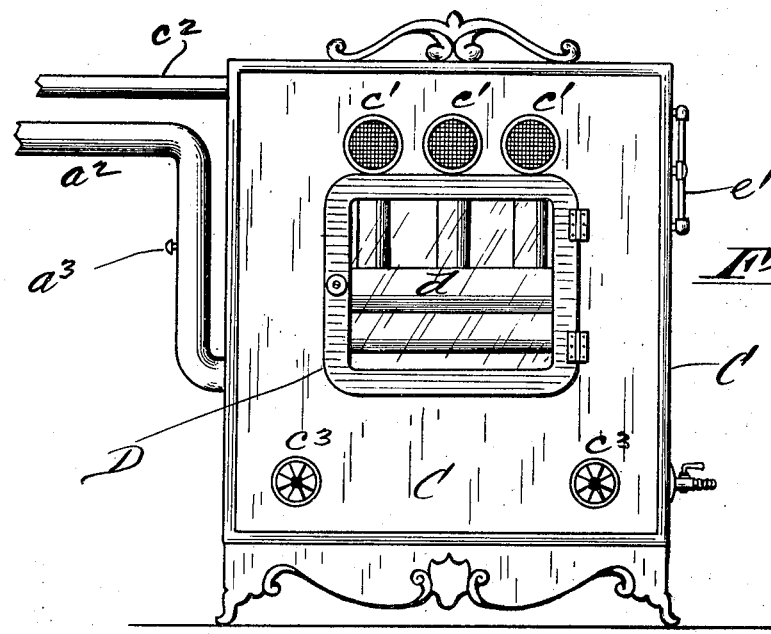
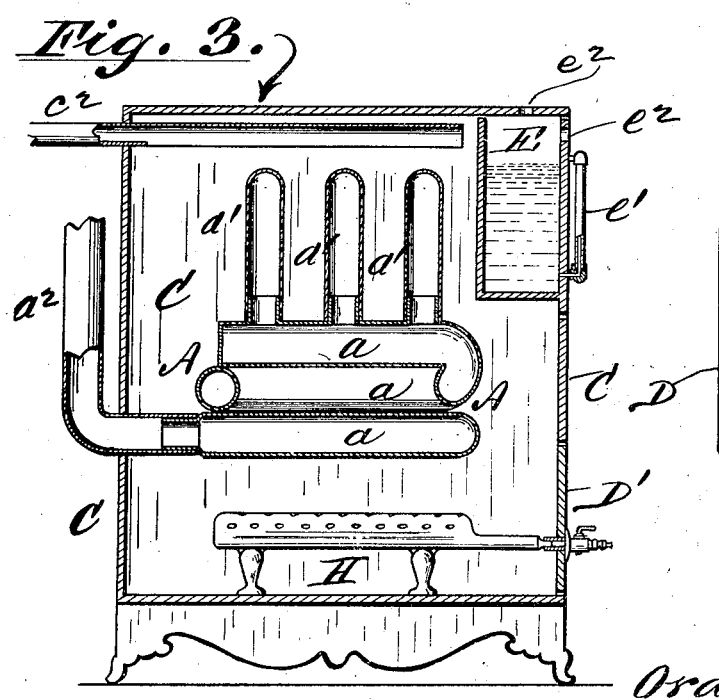
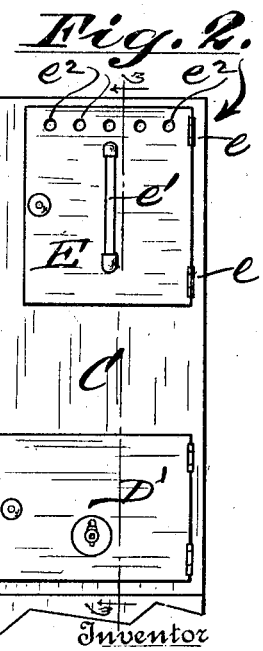
Inventor
*Orazio Pascale,*
By his Attorney, *Geo. W. Miatt*

Dec. 4, 1923.
O. PASCALE
1,476,461
AIR HEATING AND IMPREGNATING APPARATUS
Filed Nov. 16, 1922
2 Sheets-Sheet 2
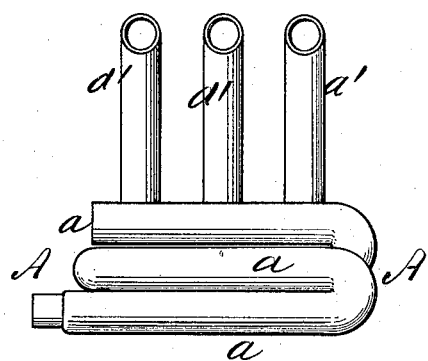
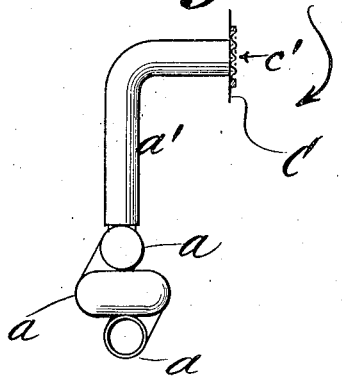
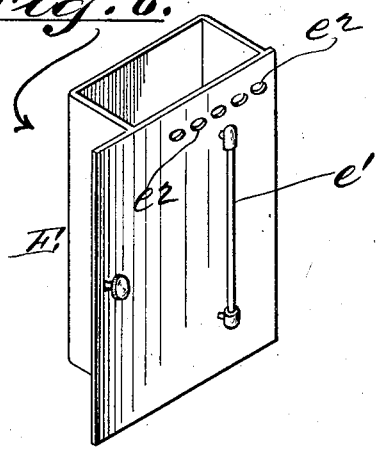
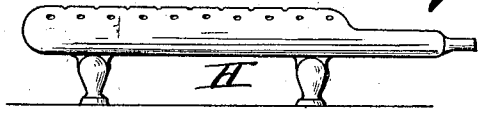
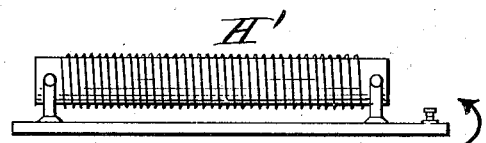
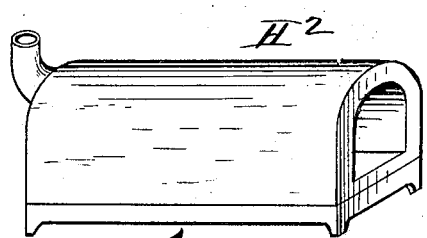
Inventor:
Orazio Pascale,
By his Attorney, Geo. Wm Hiatt Patented Dec. 4, 1923.

1,476,461

UNITED STATES PATENT OFFICE.

ORAZIO PASCALE, OF WEST NEW YORK, NEW JERSEY.

AIR HEATING AND IMPREGNATING APPARATUS.

Application filed November 16, 1922. Serial No. 601,419.

*To all whom it may concern:*

Be it known that I, ORAZIO PASCALE, a citizen of the United States, and a resident of West New York, in the county of Hudson and State of New Jersey, have invented certain new and useful Improvements in Air Heating and Impregnating Apparatus, of which the following is a specification sufficient to enable those skilled in the art to which the invention appertains to utilize the same.

The object of my invention is to afford a neat, compact and effective device for interior heating and ventilation, as well as for impregnating the air with various volatile substances, such as disinfectants, deodorizers, perfumes, medicinal preparations, and hygenic purposes generally; and the invention consists in the specific combination, arrangement and construction of parts and appurtenances hereinafter described and claimed.

In the accompanying drawings I, by way of exemplification, illustrate a practical embodiment of the essential features of my invention in preferred form of apparatus, although I do not limit myself to the identical construction and arrangement of parts and appurtenances shown, since changes and modifications may be resorted to in so far as minor details are concerned, without departing from the spirit and intent of my invention in this respect.

With this understanding,

Fig. 1, represents a front elevation of my air heating and impregnating device;

Fig. 2, a side elevation thereof;

Fig. 3, a vertical sectional elevation thereof, taken upon general plane of line 3—3, Fig. 2;

Fig. 4, is a front elevation of the air heating coil; and

Fig. 5, an end view thereof;

Fig. 6, is a perspective view of the vaporizing tank;

Fig. 7, is a view of a heating element adapted to the use of gas;

Fig. 8, is a symbolic representation of an electric heating element, suitable for use in my apparatus; and Fig. 9, is a symbolic representation of a heating element in which fuel may be used in conjunction with the air tubes.

C, is the housing or casing in which my heating and vaporizing means are enclosed, and said casing C, may be of any desired shape or configuration, as may be found most expedient in adapting the device to special use or requirements. The casing C, is provided with a front door D, provided with a glass or other transparent panel $d$, through which the interior may be inspected. The casing is also provided with a door D', on one side, this doorway being for the insertion or removal of either one of the heating elements H, H', $H^2$, as the case may be. H, representing a gas burner; H', an electric resistance coil; and $H^2$, a muffle or small stove for the combustion of charcoal or other suitable fuel. In Fig. 2, the gas burner H, is shown in position for use under the air heating coil A, although either of the other primary heating elements H', $H^2$, may be substituted therefor with like result.

The air coil A, is fixedly mounted cencentrally in the casing C, and consists preferably of a series of parallel horizontal pipes or flues $a$, $a$, surmounted with a plurality of stand pipes $a'$, $a'$, which latter are detachably supported upon the upper member of the horizontal coil pipes $a$, as by the telescopic joints shown in Fig. 2, or otherwise, as may be found most expedient. The upper ends of these stand pipes $a'$, $a'$, are formed to communicate with the screened air outlets $c'$, $c'$, in the front of the casing C, so as to discharge the heated air into the apartment or enclosure to be warmed thereby. The air to be heated is inducted from extraneous source through the inlet pipe $a^2$, which may extend to any desired source of air supply, and may be provided with a damper $a^3$, for the regulation of the inlet.

The products of combustion, if any, produced by the heating element, are drawn off through the discharge pipe $c^2$, positioned at the top of the casing C, as shown more particularly in Fig. 2, of the drawings. $c^3$, $c^3$, are dampers for controlling the admission of air to the heating element. The under side of this pipe $c^2$ is open, as seen in Figure 3.

E, is an evaporating chamber for containing water to humidify the air of the apartment or enclosure in which my heating apparatus is installed, and may be used also to impregnate the atmosphere with perfumery, volatile disinfectants, or the like, for purification, sanitation, etc., as may be found most expedient under conditions and requirements of use. This evaporating chamber or reservoir E, is mounted on hinges e, e, which admit of its being swung in and out of position as related to the casing C; and it is provided with a gauge e', for indicating the liquid level therein. Suitable openings e², e², are formed in the top of the casing C, and in the upper part of the door D², on which the receptacle (E) for liquid is mounted, to insure the escape of the volatile emanations into the surrounding atmosphere.

My apparatus is neat and compact in form and arrangement, and may be embellished externally to render it an attractive as well as a utilitarian article of furniture.

What I claim as my invention and desire to secure by Letters Patent is,

1. A device of the character described, comprising a casing, a heating element supported on the bottom thereof, an air inlet pipe extended into said casing, and an air coil supported in the casing by said inlet pipe and provided with stand pipes mounted directly thereon and disposed within said casing, the casing having a wall provided with openings with which said stand pipes communicate, said stand pipes being telescopically and detachably supported on the upper member of said air coil.

2. A device of the character described, comprising a casing, a heating element in the lower portion thereof, an air inlet pipe extended into said casing, an air coil in said casing connected with said air inlet pipe and having a plurality of nipples, stand pipes on said nipples extended upwardly in said casing, and a discharge pipe for the products of combustion arranged over said stand pipes and having its under side open, the upper portion of the casing having openings with which the upper ends of said stand pipes communicate.

ORAZIO PASCALE.

Witnesses:
GEO. WM. MIATT,
MARGARET K. HANSTEIN.